US011084599B2

(12) United States Patent
Iglewski et al.

(10) Patent No.: US 11,084,599 B2
(45) Date of Patent: Aug. 10, 2021

(54) INLET SCREEN FOR AIRCRAFT ENGINES

(71) Applicant: General Electric Company Polska sp. z o.o, Warsaw (PL)

(72) Inventors: Tomasz Iglewski, Mazowieckie (PL); Michal Filipkowski, Mazowieckie (PL); Aleksander Piotr Pasieczny, Mazowieckie (PL)

(73) Assignee: GENERAL ELECTRIC COMPANY POLSKA SP. Z O.O, Warsaw (PL)

( * ) Notice: Subject to any disclaimer, the term of this patent is extended or adjusted under 35 U.S.C. 154(b) by 445 days.

(21) Appl. No.: 15/869,823

(22) Filed: Jan. 12, 2018

(65) Prior Publication Data
US 2018/0215478 A1    Aug. 2, 2018

(30) Foreign Application Priority Data
Jan. 27, 2017    (PL) .......................................... 420326

(51) Int. Cl.
*B64D 33/02*    (2006.01)
*F02C 7/055*    (2006.01)

(52) U.S. Cl.
CPC .............. *B64D 33/02* (2013.01); *F02C 7/055* (2013.01); *B64D 2033/022* (2013.01); *B64D 2033/0293* (2013.01); *F05D 2250/10* (2013.01); *F05D 2260/607* (2013.01); *Y02T 50/60* (2013.01)

(58) Field of Classification Search
CPC ............ B64D 33/02; B64D 2033/0293; B64D 2033/022; F02C 7/055; F05D 2260/607
See application file for complete search history.

(56) References Cited

U.S. PATENT DOCUMENTS

| 1,177,320 | A |   | 3/1916  | Grabowsky |
| 2,046,458 | A |   | 7/1936  | Johnson |
| 2,663,993 | A | * | 12/1953 | Mosser .................. B64D 33/02 60/223 |
| 2,747,685 | A | * | 5/1956  | Foley ...................... F02C 7/055 55/306 |
| 3,428,278 | A |   | 2/1969  | Glaze |
| 3,526,953 | A |   | 9/1970  | Levinstein |
| 3,589,694 | A |   | 6/1971  | Gelling et al. |
| 3,667,108 | A |   | 6/1972  | Schmidt |

(Continued)

FOREIGN PATENT DOCUMENTS

| CA | 2959692 A1 * | 9/2017 | ............. B64D 15/04 |
| CN | 105253311 A * | 9/2015 | ............. B64D 33/02 |

(Continued)

OTHER PUBLICATIONS

Extended European Search Report and Opinion issued in connection with corresponding EP Application No. 18153269.8 dated Jun. 25, 2018.

(Continued)

*Primary Examiner* — Brian M O'Hara
*Assistant Examiner* — Keith L Dixon
(74) *Attorney, Agent, or Firm* — Dority & Manning, P.A.

(57) ABSTRACT

An apparatus for providing foreign object debris protection an air intake of an aircraft engine. The apparatus includes a frame and a plurality of cross-members. The cross-members are positioned in the frame to define a plurality of screen openings. At least one of the cross-members has an aerodynamically efficient cross section.

14 Claims, 6 Drawing Sheets

(56) References Cited

U.S. PATENT DOCUMENTS

| | | | |
|---|---|---|---|
| 3,833,695 A | 9/1974 | Vidal | |
| 3,908,683 A | 9/1975 | Demetrick | |
| 6,886,249 B2 | 5/2005 | Smalc | |
| 10,450,954 B2 * | 10/2019 | Grissino | F02C 7/055 |
| 2009/0294113 A1 | 12/2009 | Cha et al. | |
| 2009/0321056 A1 | 12/2009 | Ran et al. | |
| 2010/0170667 A1 | 7/2010 | Bertolotti et al. | |
| 2010/0263847 A1 | 10/2010 | Alahyari et al. | |
| 2011/0016845 A1 * | 1/2011 | Silva | B64D 33/02 60/39.092 |
| 2014/0268604 A1 | 9/2014 | Wicker et al. | |
| 2015/0176491 A1 | 6/2015 | Alnafisah | |
| 2016/0017804 A1 * | 1/2016 | Afrianto | F02C 7/055 60/39.092 |
| 2016/0089754 A1 | 3/2016 | Luo et al. | |
| 2016/0090842 A1 | 3/2016 | Luo et al. | |
| 2016/0207720 A1 | 7/2016 | Hanisch et al. | |
| 2017/0101970 A1 * | 4/2017 | Zhang | G10K 11/161 |
| 2019/0048798 A1 * | 2/2019 | Slawinska | F01D 25/02 |

FOREIGN PATENT DOCUMENTS

| | | | | |
|---|---|---|---|---|
| CN | 2016-08388 C | * | 9/2016 | B64D 33/02 |
| GB | 1201096 A | * | 8/1970 | F02C 7/052 |
| GB | 1474390 A | | 5/1977 | |
| KR | 20080037549 A | | 4/2008 | |
| WO | 2015066361 A1 | | 5/2015 | |

OTHER PUBLICATIONS

European Office Action issued for related EP Application No. 18153269.8 dated Aug. 7, 2020.

* cited by examiner

INLET SCREEN FOR AIRCRAFT ENGINES

BACKGROUND OF THE INVENTION

The present invention relates to aircraft engine efficiency and more specifically to an aerodynamic apparatus for inlet foreign object debris (FOD) screens.

Inlet screens for the prevention of foreign object debris ("FOD") are necessary for protection from potential damage and blockages that can be caused by FOD. Conventional FOD screens are formed from wire having a generally cylindrical cross section. Conventional screens cause drag as air passes through the screen resulting in diminished efficiency of the engine. Therefore there is a need for an inlet screen that is more aerodynamically efficient than conventional screens formed from generally cylindrical wire.

BRIEF DESCRIPTION OF THE INVENTION

This need is addressed by a screen having aerodynamically-efficient cross-members.

According to one aspect of the present invention, there is provided an apparatus for providing foreign object debris protection for an air intake of an aircraft engine. The apparatus includes a frame and a plurality of cross-members. The cross-members are positioned in the frame to define a plurality of screen openings. At least one of the cross-members has an aerodynamically efficient cross section.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
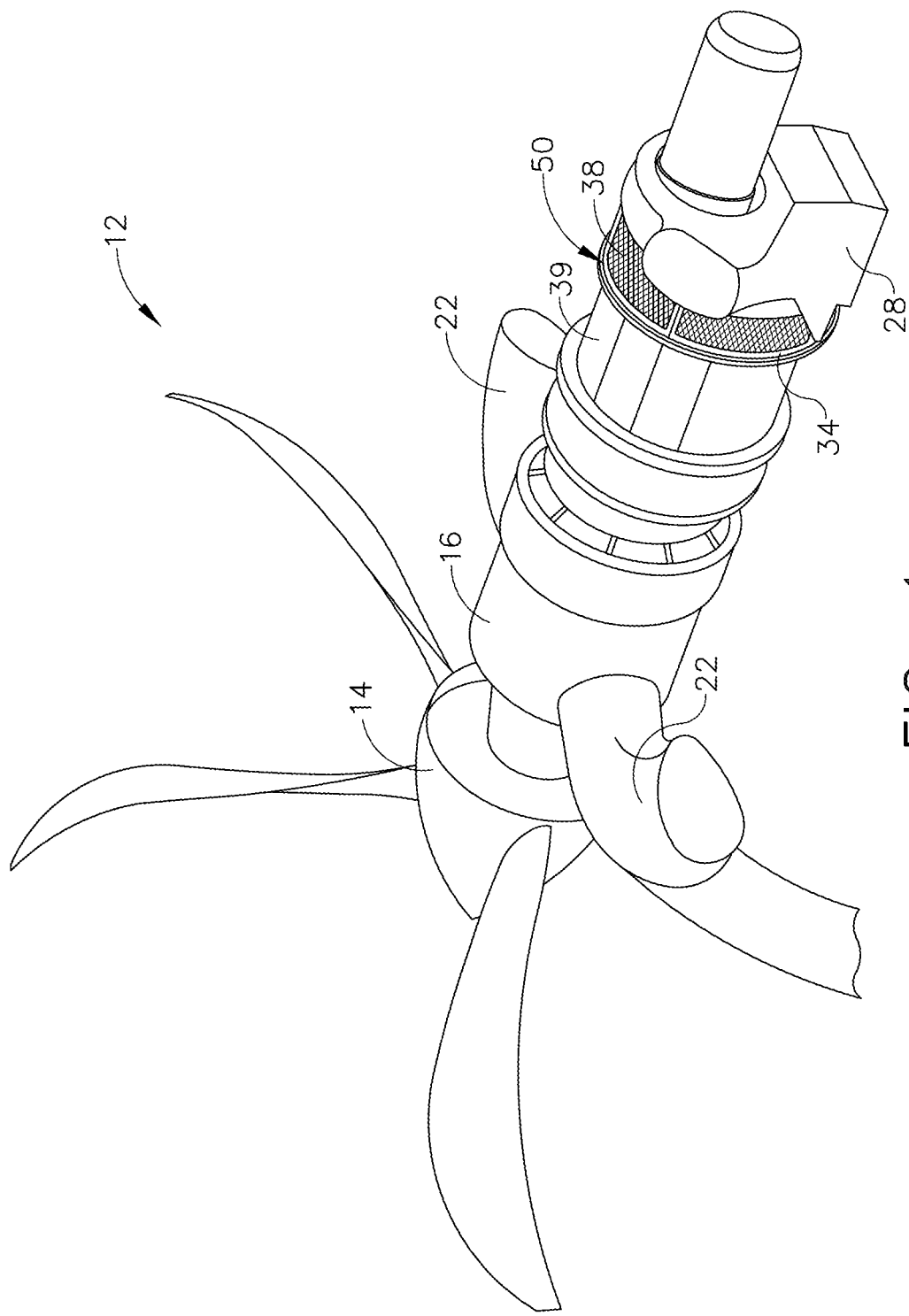
FIG. 1 shows a perspective view of an aircraft engine that includes a plurality of FOD screens according to the present invention.

Referring to the drawings wherein identical reference numerals denote the same elements throughout the various views, FIG. 1 shows an engine 12 that includes a plurality of screens 50 arranged in a screen assembly 38 such that each of the screens 50 covers an air intake inlet 34. The engine 12 also includes a propeller assembly 14, a housing 16, a pair of exhausts 22, and a mounting block 28. In the illustrated embodiment the engine 12 is a turboprop aircraft engine. In other embodiments the engine 12 could be configured for use in marine and industrial applications.

Figure 2:
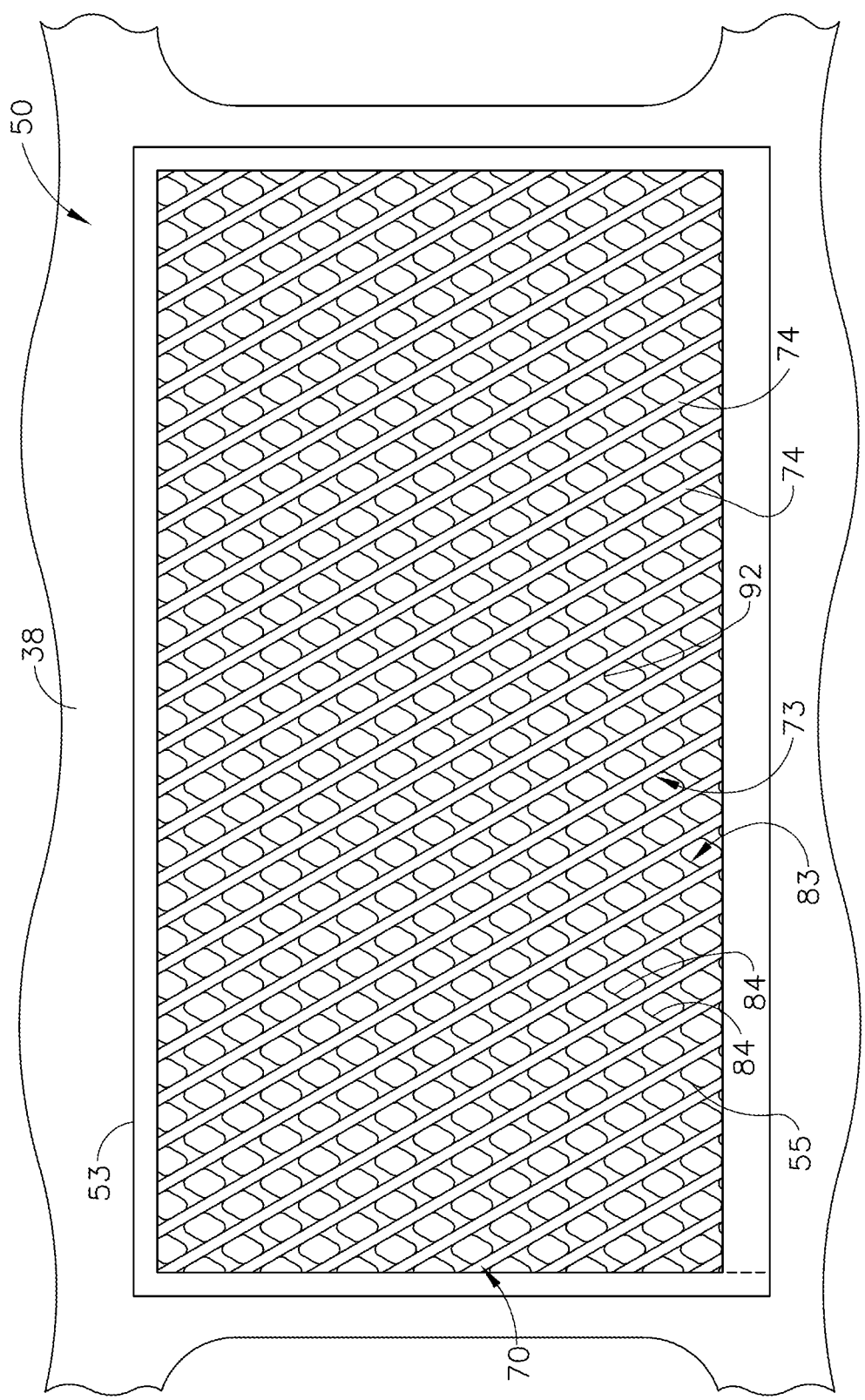
FIG. 2 shows a plan view of a screen according to the present invention.

Referring now to FIG. 2, a section of the screen assembly 38 is shown such that an exemplar screen 50 is presented in plan view. The screen 50 includes a frame 53 configured to support mesh assembly 70. In the illustrated embodiment, the frame 53 is of tubular construction and is configured to support mesh 55. The mesh 55 is configured to allow air from the outside of the engine 12 through the air intake inlet 34 and into the air intake duct 32 while preventing foreign object debris (FOD) from entering the air intake duct 32 (see FIG. 3).

Figures 5, 6:
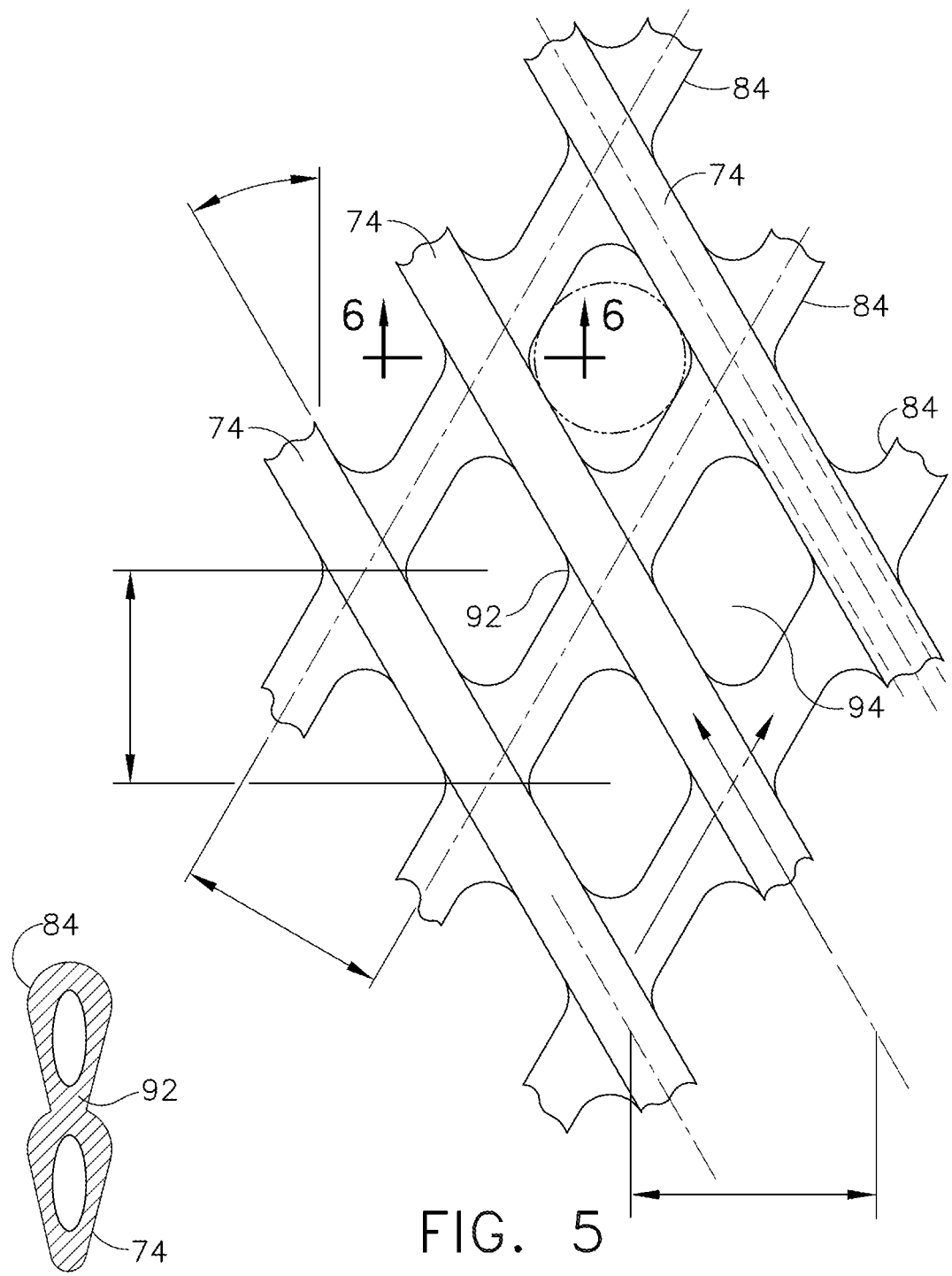
FIG. 5 shows a section of a screen.
FIG. 6 shows a section of an intersection of two tubes in a screen.

The mesh assembly 70 also includes a first tier 73 of first tier tubes 74 that is positioned offset from and in contact with a second tier 83 of second tier tubes 84. The first tier 73 and the second tier 83 are positioned relative to each other such that first tier tubes 74 and second tier tubes 84 cross to define a plurality of intersections 92. The tubes 74 and the tubes 84 are cross-members configured to block FOD. Continuing to refer to FIGS. 2 and 5, a plurality of screen openings 94 are defined by the intersections 92 and portions of the first tier tubes 74 and the second-tier tubes 84. Openings 94 are sized such that FOD above a predetermined size and shape cannot pass through.

The relative position of the first tier 73 and the second tier 83 can vary between embodiments. In some embodiments the first tier 73 and the second tier 83 are not offset and are in the same plane. In other embodiments the first tier 73 and the second tier 83 are spaced-apart from each other. And in other embodiments there can be more than two tiers and some of the tiers can be in contact and some can be spaced-apart.

In addition, the number of openings 94 in each screen 50 is also chosen to allow a predetermined airflow through screen 50. It is believed that the aerodynamically efficient tubular construction of portions of the screen 50 provide additional strength with less weight than similarly sized solid components provide.

Figure 4:
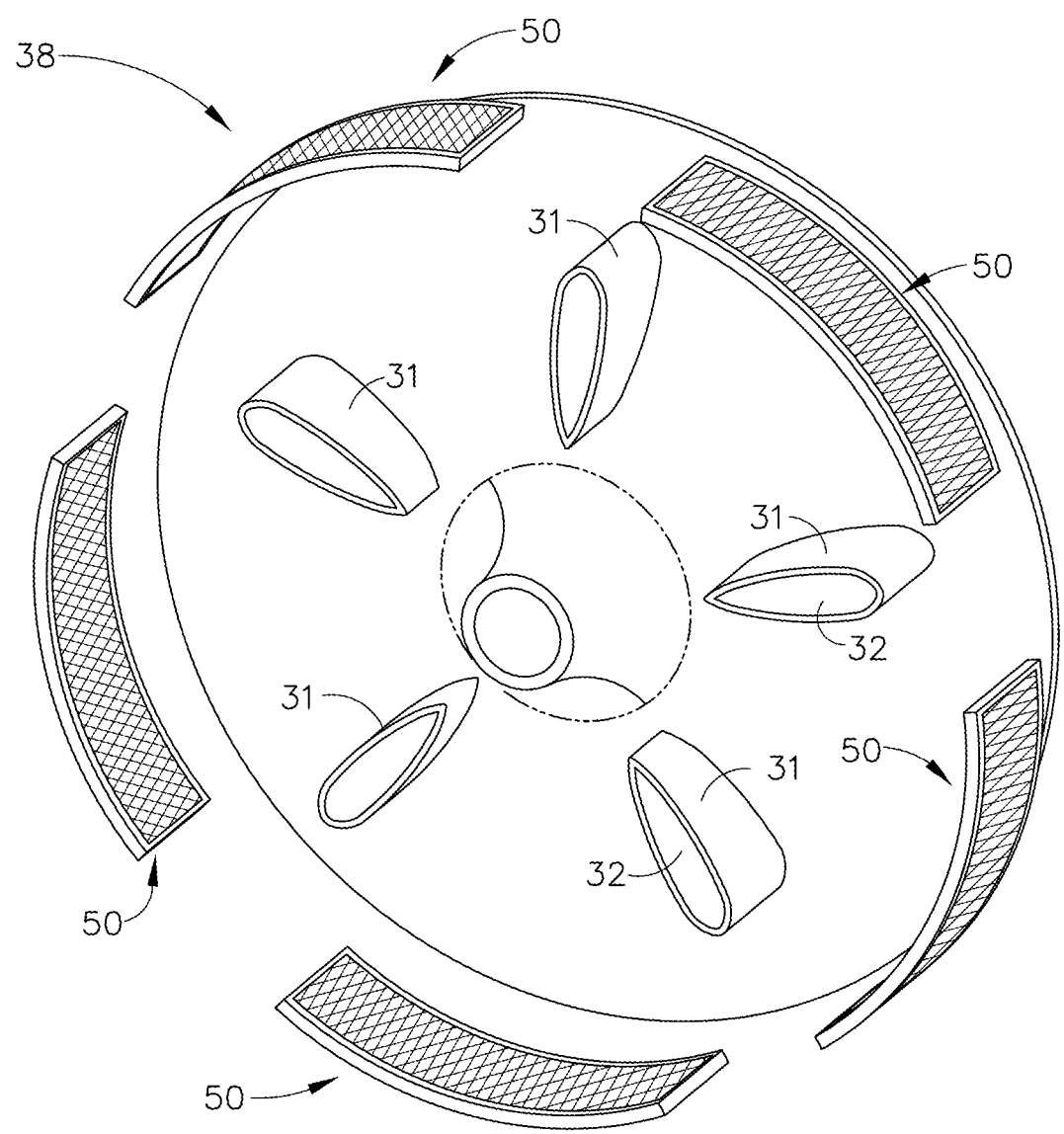
FIG. 4 shows a radially expanded view of a set of screens with sections of an associated engine.

Referring now to FIG. 4, which shows the screen assembly 38 in a radially exploded view including partial sections of a plurality of struts 31. The screens 50 are radially distributed around the engine 12 and each of the screens 50 are positioned over an associated air intake inlet 34 and air intake duct 32. The air intake duct 32 is defined by a strut 31.

Figure 3:
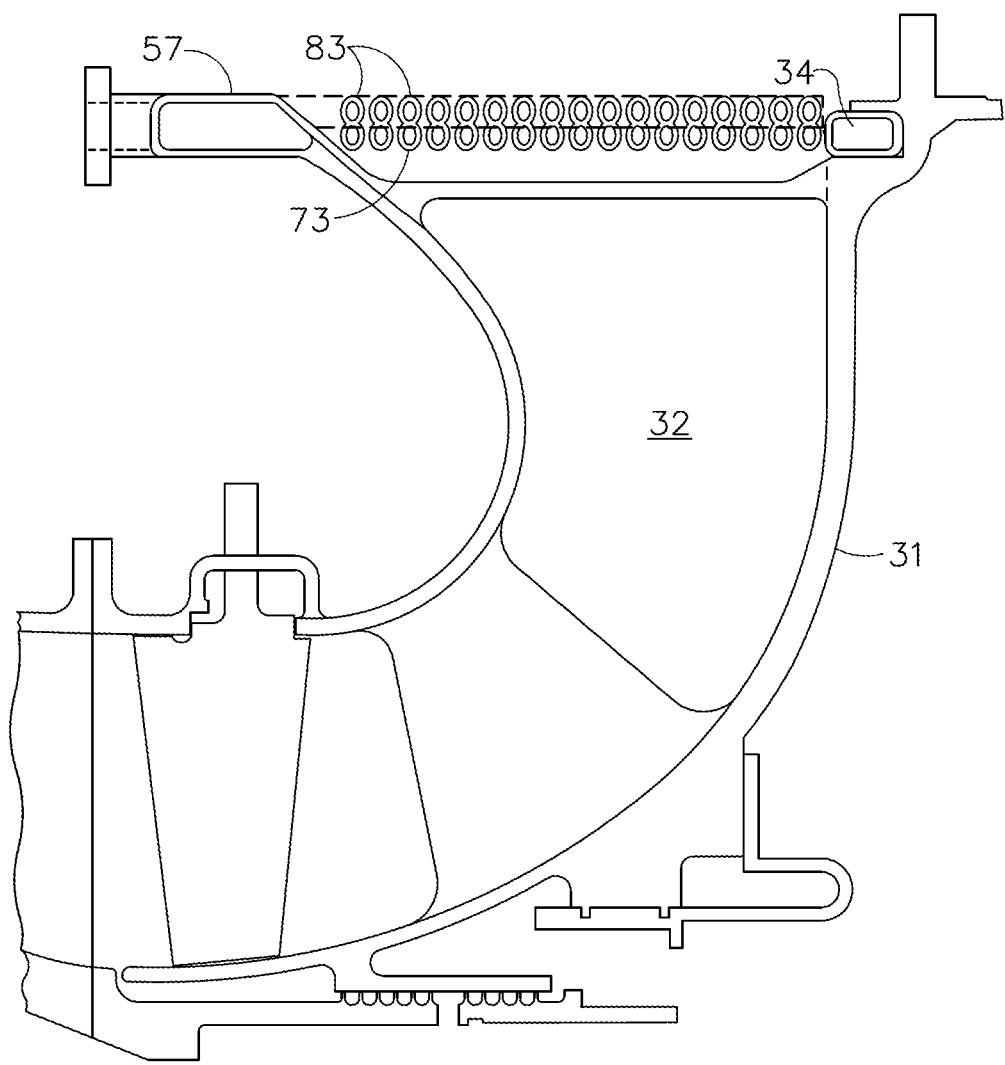
FIG. 3 shows a side cutaway view of the screen taken along line 3-3 shown in FIG. 2.

The tubes 74 and 84 are configured such that their respective cross section are not circular but instead are aerodynamically shaped and, as a result, are aerodynamically efficient. As used herein, the term "aerodynamically shaped" refers to shapes of objects that are configured to pass through air such that less turbulence and/or drag is produced around the object than if the object generally circular shapes such as round wire. As used herein, the term "aerodynamically efficient" refers to the characteristic of a structure that has a ratio of drag to thickness or diameter that is lower than that of an object having a generally circular cross section such as a round wire. Generally tubes 74 and 84 within a single embodiment have the same exterior shape as shown in FIG. 3 but it should be appreciated that the shapes of the tubes 74 and 84 can be mixed within a given screen 50. As can be seen in FIGS. 3 and 6-10, aerodynamically efficient shapes can vary from embodiment to embodiment and can be shapes other than those described herein.

Figure 7:
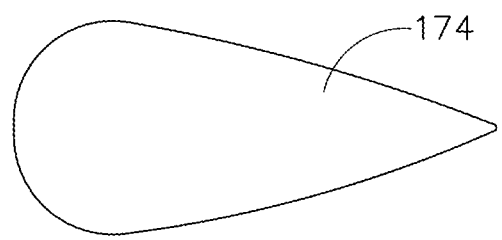
FIGS. 7-10 show cross-sections of various wires according to alternative embodiments of the present invention.
Figure 8:
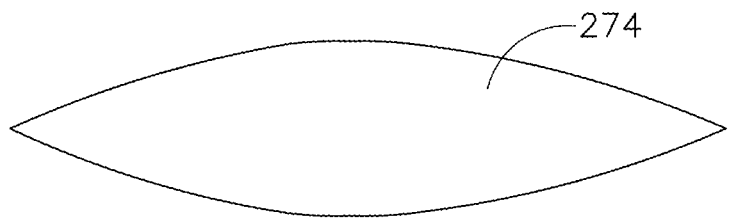
Figure 9:
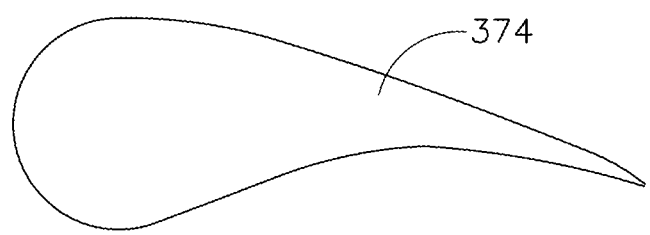
Figure 10:
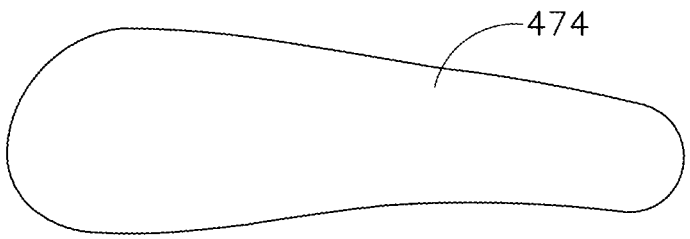

One aerodynamically efficient shape for subsonic speeds is a tear drop as exhibited by the cross section of tube 174 shown in FIG. 7. The tear drop shape is symmetrical about an axis that extends from a round front to a tapered tip. Another aerodynamically efficient shape is the symmetrical forward and aft diamond shape of tube 274 shown in FIG. 8 and having a narrow nose and tail. A third aerodynamically efficient shape is an airfoil as exhibited by tube 374 and shown in FIG. 9. The tube 374 has a convex side that curves away from an opposing concave side as shown. Another variation of the airfoil shape is shown in FIG. 10 in which tube 474 is a truncated airfoil that has less curvature in the concave side and a rounded tail in comparison with tube 374. For speeds lower than the speed of sound, the most aerodynamically efficient shape is the teardrop.

The foregoing has described an apparatus for providing aerodynamically efficient FOD screen. Because of the aerodynamic efficiency of the above described FOD screens, they provide protection with less wasted energy. Such screens can be used for any machine or application that requires FOD-free fluid (such as air and other gases or liquids). Such other applications include IC engines, fans, cooling water, oil, etc. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying potential points of novelty, abstract and drawings), or to any novel one, or any novel combination, of the steps of any method or process so disclosed.

What is claimed is:

1. An apparatus for providing foreign object debris protection for an air intake of an aircraft engine, the apparatus comprising;
    a frame;
    a plurality of cross-members positioned in the frame to define a plurality of screen openings, wherein the plurality of cross-members form a mesh assembly supported by the frame, the mesh assembly having a first tier and a second tier with a first portion of the plurality of cross-members being in the first tier and a second portion of the plurality of cross-members being in the second tier, the first tier and second tier together defining a mesh of the mesh assembly, the first tier overlapping and in thermal communication with the second tier; and
    wherein at least one of the cross-members has an aerodynamically efficient cross section.

2. The apparatus according to claim 1, wherein the plurality of cross-members are tubular.

3. The apparatus according to claim 1, wherein the frame is also configured to support a mesh that is not configured to be heated.

4. The apparatus according to claim 1, wherein the first portion of the plurality of cross-members are are positioned generally parallel to each other.

5. The apparatus according to claim 4, wherein the second portion of the plurality of cross-members are positioned generally parallel to each other and cross the first portion of the plurality of cross-members to form a mesh.

6. The apparatus according to claim 5, wherein the mesh is configured to prevent foreign object debris from entering the air intake of the engine.

7. The apparatus according to claim 1, wherein the first portion of the plurality of cross-members are tubular and the second portion of the plurality of cross-members are solid wire links.

8. The apparatus according to claim 1, wherein the aerodynamically efficient cross-section is teardrop shaped.

9. The apparatus according to claim 8, wherein a tail of the cross-section is narrow.

10. The apparatus according to claim 8, wherein a tail of the cross-section pointed.

11. The apparatus according to claim 8, wherein a tail of the cross-section is rounded.

12. The apparatus according to claim 1, wherein the aerodynamically efficient cross-section is generally diamond shaped.

13. The apparatus according to claim 12, wherein one end of the cross-section is general rounded.

14. The apparatus according to claim 13, wherein both ends of the cross section are rounded.

* * * * *